United States Patent [19]

Koerner

[11] Patent Number: 5,060,703
[45] Date of Patent: Oct. 29, 1991

[54] APPARATUS FOR FILLING HYDRAULIC SYSTEMS

[76] Inventor: Arthur Koerner, 3901 Waterview, Rochester, Mich. 48064

[21] Appl. No.: 504,093

[22] Filed: Apr. 2, 1990

Related U.S. Application Data

[63] Continuation of Ser. No. 238,769, Aug. 31, 1988, abandoned.

[51] Int. Cl.$^5$ .......................... B65B 31/00; B65B 1/04
[52] U.S. Cl. ........................................ 141/59; 141/65; 141/98; 188/352
[58] Field of Search .................. 141/59, 65, 98, 4; 188/322.21, 352; 60/584; 73/40.5 R

[56] References Cited

U.S. PATENT DOCUMENTS

| | | | |
|---|---|---|---|
| 1,617,020 | 2/1927 | Merwin | 188/352 |
| 2,295,539 | 9/1942 | Beach | 60/584 |
| 3,339,401 | 9/1967 | Peters | 73/40.5 R |
| 3,425,464 | 2/1969 | Hughes | 141/59 |
| 4,017,329 | 4/1977 | Larson | 134/21 |
| 4,415,071 | 11/1983 | Butler et al. | 188/352 |
| 4,503,678 | 3/1985 | Wimbush | 60/584 |
| 4,506,507 | 3/1985 | Wimbush | 60/584 |
| 4,708,175 | 11/1987 | Janashak et al. | 141/1 |
| 4,756,159 | 7/1988 | Compton et al. | 188/352 |
| 4,793,386 | 12/1988 | Sloan | 141/65 |

FOREIGN PATENT DOCUMENTS

| | | | |
|---|---|---|---|
| 2309559 | 2/1972 | Fed. Rep. of Germany | 188/352 |
| 2744767 | 4/1979 | Fed. Rep. of Germany | 141/4 |
| 1164109 | 6/1985 | U.S.S.R. | 141/98 |
| 2086834 | 5/1982 | United Kingdom | 141/59 |

*Primary Examiner*—Henry J. Recla
*Assistant Examiner*—Keith Kupferschmid
*Attorney, Agent, or Firm*—Reising, Ethington, Barnard, Perry & Milton

[57] ABSTRACT

A brake filling apparatus uses nitrogen or dry air as a desiccant to assure freedom from moisture in brake fluid supplied from a supply tank as well as at the filling location. A main fluid tank has a vacuum over the fluid to deaerate the fluid and has a pump submerged in the fluid to deliver fluid to the brake system. The pump is driven by a submerged motor which is driven by pressurized brake fluid. The brake system is evacuated, the low pressure is monitored for a test interval for leak detection, the system is filled by the pump and excess fluid is returned to the main tank and is replaced by the nitrogen or dry air.

7 Claims, 2 Drawing Sheets

APPARATUS FOR FILLING HYDRAULIC SYSTEMS

This application is a continuation of application Ser. No. 238,769, filed 8/31/88 now abandoned.

FIELD OF THE INVENTION

This invention relates to a method and apparatus for filling hydraulic systems such as brake systems with fluid and particularly to such method and apparatus which exclude water and air from the fluid during the filling operation.

BACKGROUND OF THE INVENTION

Vehicle brake systems as well as other hydraulic systems require brake or hydraulic fluid which is free of entrained air bubbles and water vapor. Both of these substances, if present in the system, deteriorate the quality of the fluid by lowering the boiling point and increasing the compressibility of the fluid. This condition causes spongy operation thereby preventing the desired quick and firm response to an input force. Atmospheric air is the source of humidity and water as well as air bubbles. The fluid, particularly brake fluid is hygroscopic, thus tending to absorb moisture from the ambient air. To prevent air and water from entering the system during manufacture it is customary to take special care in filling the system. In particular, it is known to evacuate the system to remove air and water prior to filling with the fluid.

The U.S. Pat. No. 3,339,401 to Peters shows a brake fill machine which has an overhead mounted portable coupling device coacting with a vehicle chassis on a production line. A vacuum source evacuates the brake system, a brake fluid supply fills the system, a flow responsive unit and a vacuum sensor check for leaks, and a fluid salvage device receives excess fluid. According to the disclosure suitable valving is operated by an electrical control to cause the brake lines to be evacuated, a vacuum sensor tests for leaks and, if the brake lines are acceptable, valves are opened to fill the brake lines under pressure. Other U.S. patents disclosing the method and apparatus for evacuating a brake or other hydraulic system and then filling with fluid are Larson U.S. Pat. No. 4,017,329, Wimbush U.S. Pat. No. 4,503,678, Wimbush U.S. Pat. No. 4,506,507 and Janashak et al U.S. Pat. No. 4,708,175.

In order to successfully carry out the scheme of evacuating a brake system and filling it with fluid it is necessary to manage the fluid supply to avoid contamination of the fluid and especially to protect it from contact with atmospheric air. It is also important to prevent the formation of air bubbles in the fluid when pumping or otherwise transferring the fluid. In the event the fluid, as received, contains air or moisture it is important to remove those contaminants. To accomplish these goals it is the practice when filling automotive brake systems to maintain a vacuum over the fluid at each stage of fluid handling. It has been found that less extreme and more reliable techniques can be used in place of much of such vacuum systems.

SUMMARY OF THE INVENTION

It is therefore an object of the invention to provide a method and apparatus for filling brake or other hydraulic systems and for preconditioning the fluid to assure freedom from water and air.

The invention is carried out by an apparatus for filling a hydraulic system with fluid and for excluding air and water from the system comprising; an adaptor for coupling to the hydraulic system, a vacuum pump connected to the adaptor for evacuating the system, a closed vessel containing a supply of hydraulic fluid, means coupling the vacuum pump to the vessel for maintaining a vacuum above the supply of hydraulic fluid, and pump means mounted within the closed vessel and connected to the adaptor for supplying hydraulic fluid to the system.

The invention is further carried out by the method of filling a hydraulic system comprising the steps of; evacuating the system, providing a supply of hydraulic fluid in a vessel, removing water vapor and air from the supply of hydraulic fluid by evacuating the space in the vessel above the supply of fluid, transferring fluid from the evacuated vessel to the evacuated system until the system is filled, whereby the filled system is free of water and air bubbles, replenishing the fluid in the vessel by transferring fluid from a supply tank, and maintaining a desiccant in the form of dry gas in the supply tank to assure that the fluid transferred to the vessel is free of water.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The subject invention is especially adapted to filling vehicle brake systems during automotive assembly and is described for that specific embodiment. It will be recognized, however, that the method and apparatus apply to other kinds of hydraulic systems. Accordingly the terms "hydraulic fluid" or "hydraulic system" are considered to include "brake system" or "brake fluid".

Figure 1:
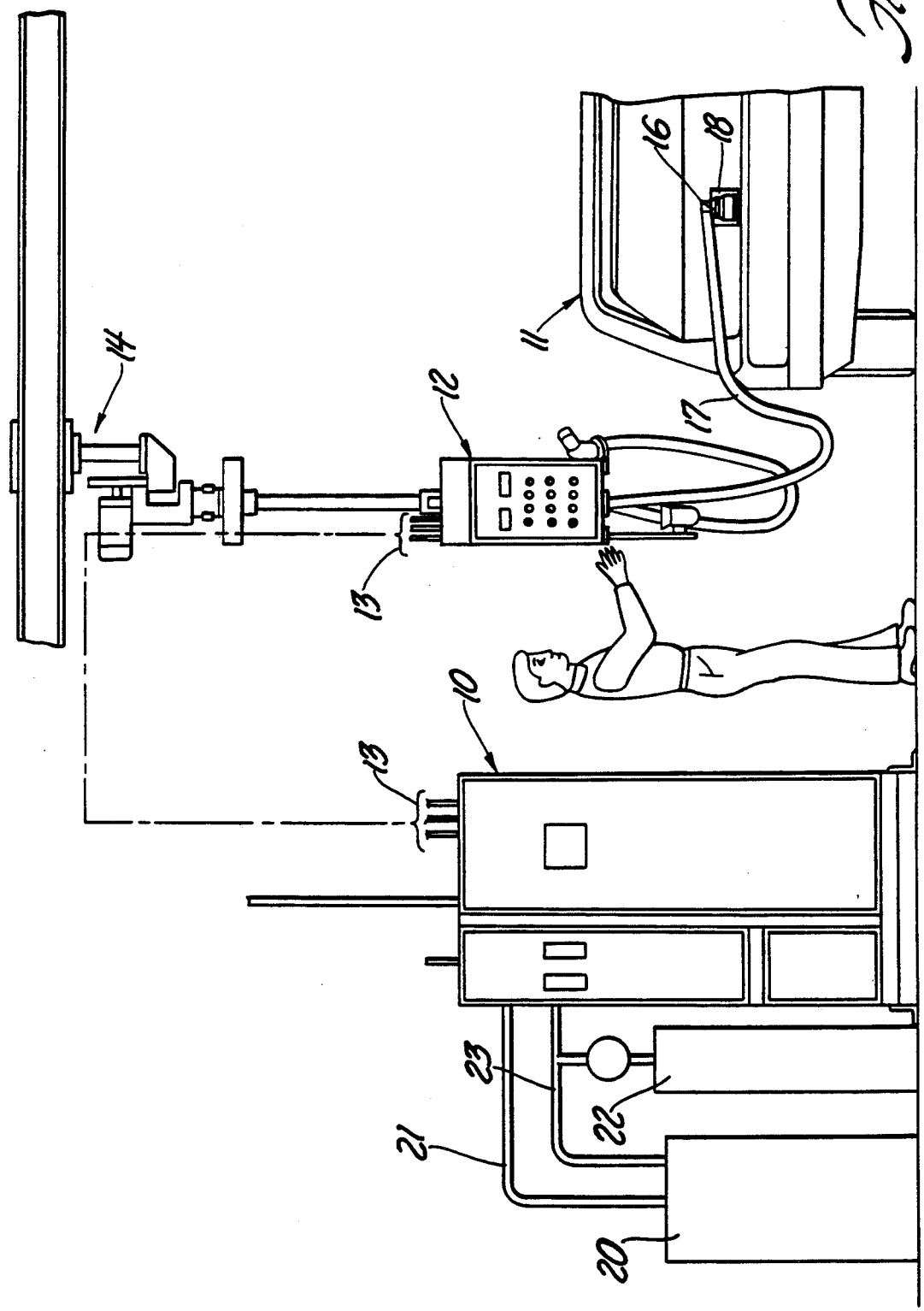
FIG. 1 is a schematic elevation of a plant installation of a brake filling system according to the invention.

Referring to FIG. 1, a brake filling system installed on an automotive assembly line comprises a base unit 10 on the floor adjacent the line of travel of vehicles 11, a console 12 mounted on an overhead track 14 for movement both parallel to and transverse to the vehicle path and connected by tubes 13 to the base unit, and a filling adaptor 16 coupled by a connecting tube 17 to the console 12. The console includes a control panel to allow operator control of the immediate filling functions at the filling site. The vehicles 11, of course, each have a brake system 18 to which the filling adaptor 16 is attached by an operator when the vehicle comes into position at the brake filling station. Materials for supplying the base unit are the brake fluid contained in a drum 20 and nitrogen in tanks 22. These are transported to the station as needed and coupled by suitable lines 21 and 23, respectively, to the base unit 10. The line 23 also couples the nitrogen tanks 22 to the drum 20. Optionally, an air drier can be used in place of the nitrogen tanks.

Figure 2:
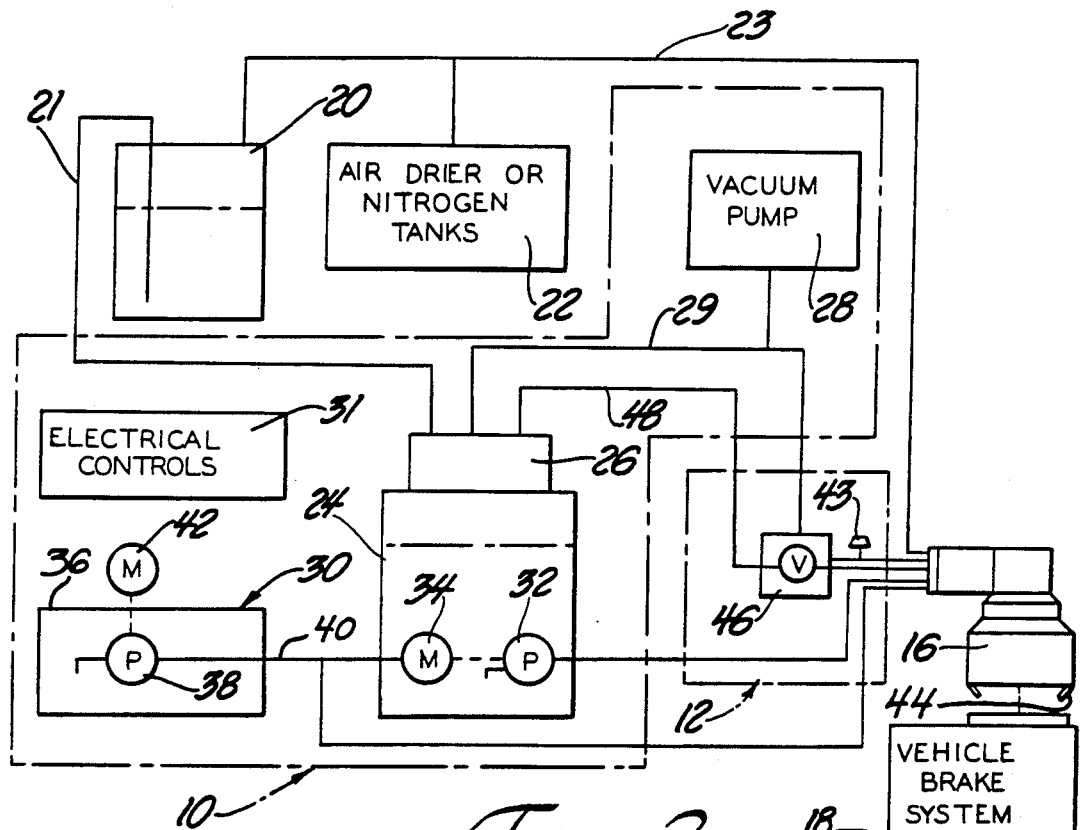
FIG. 2 is a schematic diagram of the brake filling apparatus of FIG. 1.

As shown in FIG. 2, the base unit 10 includes a main tank 24 having a control valve assembly 26 for controlling incoming lines, a vacuum pump 28, and a hydraulic pressure source 30. Electrical controls 31 for operating solenoid valves in the various lines are incorporated in the base unit and interface with the control panel in the console 12. To simplify the drawings the valves are not shown; they are employed in the conventional manner as dictated by the required control functions. The vacuum pump 28 is coupled by line 29 to the console 12 for the evacuation of the brake system and to the main tank 24 via the valve assembly 26 to maintain a vacuum above the fluid in the main tank. The main tank 24 is a closed vessel partially filled with brake fluid, leaving a vacuum space above the fluid, and contains a pump 32 submerged in the fluid which is driven by a hydraulic motor 34 also submerged in the fluid. The pump 32 supplies fluid to the brake system via the console 12. In the event the pump 32 suffers a leak, air cannot be drawn into the pumped fluid because the submerged pump is not exposed to air and likewise, any fluid leaking from the pump is not wasted. The motor 34 is either a linear acting cylinder or a rotary motor and is driven by pressurized fluid from the pressure source 30. The pressurized fluid is the same as the brake fluid in the main tank 24 so that in case of a leak at the motor 34 the brake fluid is not contaminated.

The hydraulic pressure source 30 comprises a tank 36 containing brake fluid and a pump 38 submerged in the fluid for supplying fluid to pressure line 40 which is connected to the motor 34 and to the adaptor 16 via the console 12. The pump 38 is driven by an electric motor 42 outside the tank 36.

The console 12 interfaces between the base unit 10 and the adaptor 16 to couple hydraulic pressure, vacuum and dry gas to the adaptor 16 under operator control. A pressure sensor 43 coupled to the adaptor vacuum line monitors the brake system pressure after the vacuum line is closed off to detect leakage in the system. The adaptor 16 has clamps 44 operated by the pressure line 40 for securing the adaptor to the brake system. The console also has a top off control 46 which is effective after the brake system is filled to withdraw excess fluid from the brake system by coupling a line 48 from the adaptor to the main tank and, at the same time, supplying nitrogen or dry air via line 23 to replace the excess fluid and to provide pressure to return the excess fluid to the main tank.

In operation, nitrogen or dry air is supplied to the drum 20 to serve as a desiccant to assure that the fluid in the drum is protected from the atmosphere and to remove any water which may be in the fluid. From time to time fluid in the main tank 24 is replenished by opening a valve in the assembly 26 to allow fresh fluid to be drawn through line 21 into the evacuated tank 24. There, the vacuum in the tank deaerates the fluid prior to supplying it to the adaptor. When a vehicle is in position at the brake filling station an operator attaches the adaptor 16 to the brake system 18 of the vehicle and the adaptor is clamped in place by the clamps 44 operated by fluid pressure on line 40.

Figure 3:
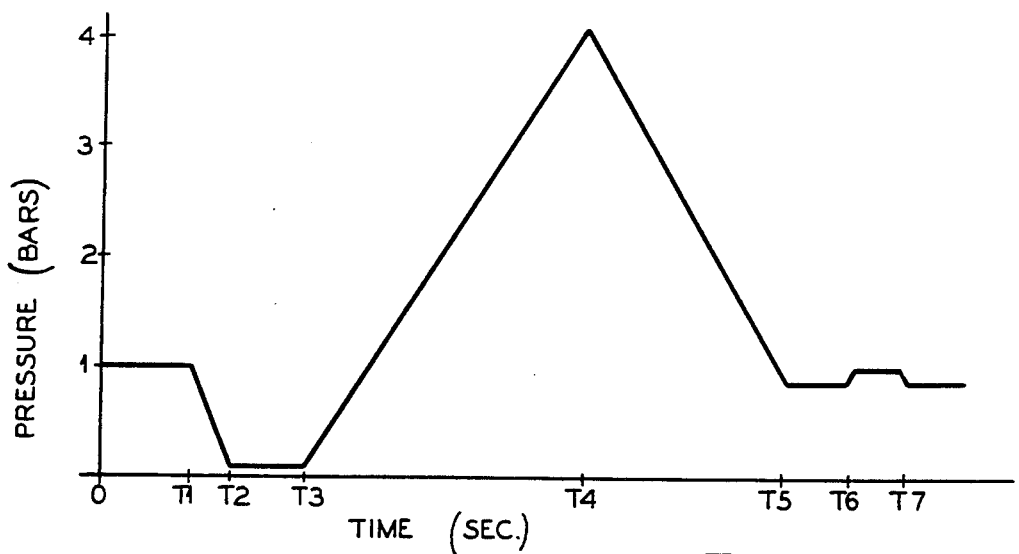
FIG. 3 is a time chart of brake system pressure during filling.

As depicted in the brake system pressure diagram of FIG. 3 the pressure is at 1 bar when the adaptor is clamped in place. Then at time T1 the vacuum line is opened to the adaptor and the system is rapidly evacuated. At time T2 the system pressure reaches 2 mbars and the vacuum line is closed. Between time T2 and T3 the pressure is monitored by the pressure sensor 43 to detect brake system leaks. If the pressure remains substantially at the 2 mbar level the leak test is acceptable and at time T3 fluid is supplied by pump 32 to fill the system until at time T4 the pressure reaches approximately 4 bars. The pressure is reduced to 1 bar and, at time T5, the topping off action occurs whereby the pressure is reduced slightly below 1 bar while the excess fluid flows to the main tank 24. As nitrogen or dry air is supplied to the system the pressure returns to 1 bar at T6. A slight vacuum is drawn on the adaptor as it is removed from the brake system at time T7 to avoid spillage of fluid. Then the process is complete, the whole cycle taking less than one minute.

It will thus be seen that the invention provides an improved brake filling method and apparatus which minimizes the usage of vacuum for fluid protection and enhances the quality and reliability of the equipment.

The embodiments of the invention in which an exclusive property of privilege is claimed are defined as follows:

1. An apparatus for filling a vehicle hydraulic brake system with hydraulic brake fluid and for excluding air and water from the system comprising:
    an adaptor for coupling to the hydraulic brake system,
    a vacuum pump connected to the adaptor for evacuating the brake system,
    a closed vessel containing a supply of hydraulic brake fluid,
    means coupling the vacuum pump to the vessel for maintaining a vacuum above the supply of hydraulic brake fluid, and
    pump means mounted within the closed vessel and connected to the adaptor for supplying pressurized hydraulic brake fluid to the system.

2. The invention as defined in claim 1 wherein the pump means is submerged in he hydraulic brake fluid whereby air is prevented from entering the brake system via the pump means.

3. The invention as defined in claim 2 including another source of pressurized hydraulic fluids, and
    the pump means including a hydraulic motor driven by said another source of pressurized hydraulic fluid.

4. The invention as defined in claim 1 further comprising:
    a source of dry gas,
    means for replenishing the supply of hydraulic brake fluid in the closed vessel including a container of brake fluid coupled to the closed vessel, and
    means for connecting the source of dry gas to the container for maintaining dry gas above the brake fluid in the container, whereby the dry gas excludes water vapor from the container and also serves as a desiccant to remove water from the brake fluid.

5. The invention as defined in claim 4 wherein the source of dry gas is an air drier.

6. The invention as defined in claim 4 wherein the dry gas is nitrogen.

7. The invention as defined in claim 4 wherein the adaptor includes means effective after filling for removing excess brake fluid from the system and returning the excess brake fluid to the vessel and for replacing the excess brake fluid with dry gas.

* * * * *